(12) United States Patent
Finkler et al.

(10) Patent No.: US 7,242,182 B2
(45) Date of Patent: Jul. 10, 2007

(54) POSITION SENSOR AND CORRESPONDING METHOD FOR DETECTING THE POSITION OF A ROTATING ELEMENT

(75) Inventors: Roland Finkler, Erlangen (DE); Hans-Georg Köpken, Erlangen (DE); Christoph Nolting, Höchstadt/Aisch (DE); Günter Schwesig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 188 days.

(21) Appl. No.: 11/042,872

(22) Filed: Jan. 25, 2005

(65) Prior Publication Data
US 2005/0162156 A1 Jul. 28, 2005

(30) Foreign Application Priority Data
Jan. 27, 2004 (DE) .................. 10 2004 004 100

(51) Int. Cl.
*G01B 7/14* (2006.01)
*H01F 5/00* (2006.01)
*B41J 29/00* (2006.01)

(52) U.S. Cl. .................. 324/207.24; 324/207.17
(58) Field of Classification Search ........... 324/207.13, 324/207.15–207.19, 207.22, 207.24; 340/870.31, 340/870.33, 870.35, 870.36; 400/705
See application file for complete search history.

(56) References Cited

U.S. PATENT DOCUMENTS

| 4,099,164 | A | * | 7/1978 | Sidor et al. ............ 340/870.33 |
| 4,774,465 | A | * | 9/1988 | Nilius .................... 324/207.18 |
| 5,121,327 | A |   | 6/1992 | Salazar |
| 6,222,360 | B1 | * | 4/2001 | Tischer et al. ......... 324/207.18 |
| 6,605,940 | B1 | * | 8/2003 | Tabrizi et al. ......... 324/207.18 |
| 6,803,758 | B1 | * | 10/2004 | Nicholson ............. 324/207.18 |
| 2004/0036468 | A1 | * | 2/2004 | Hoffelder et al. ...... 324/207.17 |

FOREIGN PATENT DOCUMENTS

DE    198 05 783 A1    9/1999

OTHER PUBLICATIONS

Tyco Electrnics AMP GmbH, "PLCD displacement sensor for industrial applications", 2001.

* cited by examiner

*Primary Examiner*—Edward Lefkowitz
*Assistant Examiner*—Kenneth J. Whittington

(57) ABSTRACT

A low-wear sensor with little structural outlay to detect a combined linear and rotational movement, such as in a print roller (10). In one embodiment, a PLCD (Permanent Magnetic Linear contactless Displacement) sensor includes a magnet (5) which can be rotated about a longitudinally extended coil (2). A ring magnet is particularly suitable for this. The linear position of the ring magnet can be determined independently of its rotational movement (7) by means of the voltage induced in coils (3,4). Detection of the linear position is contactless and thus wear-free.

9 Claims, 1 Drawing Sheet

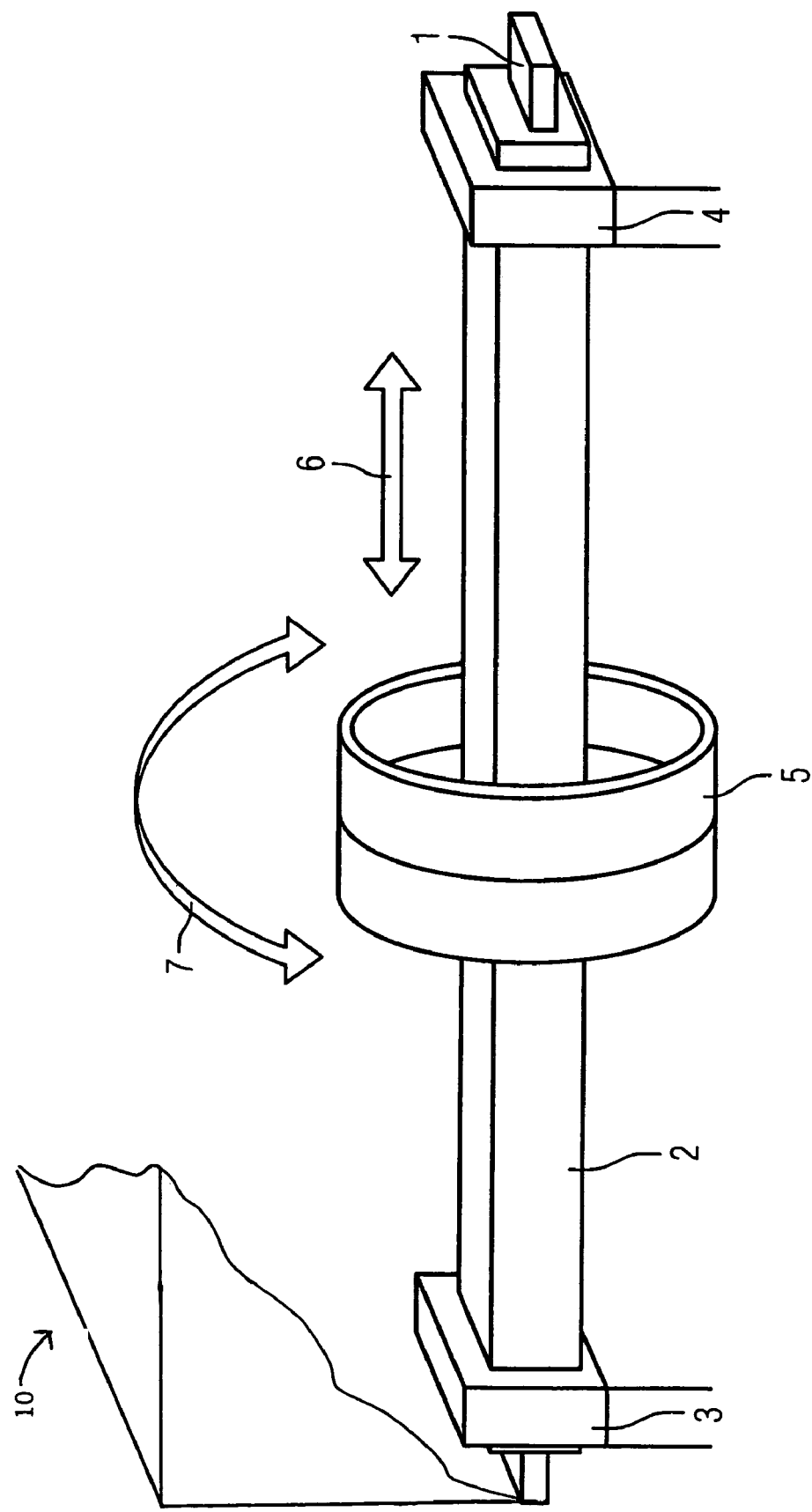

POSITION SENSOR AND CORRESPONDING METHOD FOR DETECTING THE POSITION OF A ROTATING ELEMENT

CROSS REFERENCE TO RELATED APPLICATIONS

This application claims priority to the German application No. 10 2004 004 100.8, filed Jan. 27, 2004 and which is incorporated by reference herein in its entirety.

FIELD OF INVENTION

The present invention relates to a position sensor for detecting the axial position of a rotating element using a longitudinally extended soft magnetic core, a first coil, essentially the entire longitudinal extension of which is wound round the soft magnetic core, a second coil, which is short in comparison with the first coil in the longitudinal direction of the core, and is wound round one end of the core, and a magnet which can be positioned and moved in the longitudinal direction of the core. The present invention further relates to a corresponding method for detecting the axial position of a rotating element.

BACKGROUND OF INVENTION

Drives are needed for certain applications, e.g. distributor rollers in printing machines, whereby a rotational movement can be superimposed with a short-stroke linear movement. A so-called combination drive, whereby an electric (torque) motor is combined structurally with a linear motor, enables such superimposed movement to be produced. Both sub-drives each require a feedback sensor, which must not be influenced by the other movement in each instance. This means that the linear position sensor cannot be influenced by the rotational movement of the drive and the rotation sensor must operate independently of any linear movement.

In the printing industry however with the combination drives mainly used for at present for distributor rollers the linear movement is generated from the rotational movement by way of a mechanical system, e.g. cam plates, connecting rods, etc. In this case, only a conventional rotation sensor is required, which is integrated into the motor. It detects the rotational movement and the linear movement is automatically derived from this.

SUMMARY OF INVENTION

Since however there is a need for it to be possible for the sub-movements of the drive to be carried out independently of one another, the object of the present invention is to propose a sensor whereby the linear movement and/or position can be detected independently of a rotational movement.

According to the invention, this object is achieved by means of a position sensor for detecting the axial position of a rotating element with a longitudinally extended, soft magnetic core, a first coil, essentially the entire longitudinal extension of which is wound round the soft magnetic core, a second coil which is short in comparison with the first coil in the longitudinal direction of the core, and is wound round a first end of the core, and a magnet which is polarized and can be moved in the longitudinal direction of the core, as well as a rotational device, by means of which the magnet can be rotated about the longitudinal axis of the core. When using the position sensor, it is however irrelevant whether the magnet is rotated about the coil or the coil is rotated in respect of a fixed magnet.

According to the invention a method is also provided for detecting the axial position of a rotating element by providing a magnet, which is connected in a fixed manner to the rotating element, rotating the magnet with the rotating element about its axis and detecting the axial position of the magnet in a contactless manner.

To detect the axial position of the magnet, the core of a coil arranged coaxially in respect of the rotating element is preferably magnetically saturated by the magnet at a point corresponding to the axial position of the magnet. The position of the rotating element can thus be determined in a comparatively precise and contactless manner by means of the changed behavior of the coil.

To obtain an approximate linear characteristic for the detection of the linear position of the magnet, a third coil can be provided which is short in comparison with the first coil in the longitudinal direction of the core and is wound round a second end of the core.

The magnet can also be of an annular configuration, the specified soft magnetic core including the first coil being arranged in its opening. With this configuration the area of the core lying within the magnet ring can be very effectively saturated. If the magnet is not annular, it must be correspondingly heavily magnetized, so that sufficient saturation is achieved in the core and an adequate position signal can thus be obtained.

The magnet is preferably a permanent magnet, thereby achieving minimal size whilst still ensuring simple operation. The magnet is preferably fixed to the rotating element and/or a part thereof, which thus serves as a rotational device.

The soft magnetic core of the first coil is preferably configured as a bar or strip, resulting in a favorable structure for the longitudinally extended first coil. If the coil is configured as a round bar, the position sensor signal is invariant in respect of any rotational movement regardless of the shape of the magnet.

In a particularly preferred exemplary embodiment the position sensor has the functionality of a PLCD sensor. For use according to the invention, the magnet of a commercially available PLCD sensor is simply to be fitted onto the rotating element or a ring magnet is to be used instead, inside which an intensified magnetic field is present.

One advantageous use of the position sensor results for distributor rollers in the printing industry which themselves serve as rotating elements and/or rotational devices.

BRIEF DESCRIPTION OF THE DRAWING

The present invention is now described in more detail with reference to the sole FIGURE, which shows a cut-away perspective view of a print roller illustrating a position sensor according to the invention.

DETAILED DESCRIPTION OF INVENTION

The exemplary embodiment described in more detail below shows a preferred embodiment of the present invention.

The feedback transmitter for the linear motor of a print roller 10, for instance, shown in the figure is implemented in the form of a PLCD sensor (Permanent Magnetic Linear Contactless Displacement Sensor). This PLCD sensor has a strip-type core 1 made from soft magnetic material. Three coils 2, 3, and 4 are wound onto this core 1. The first coil 2 extends approximately over the entire length of the core 1 and an AC voltage is applied. The second and third coils 3, 4 are located at the ends of the core 1 and/or the first coil 2. This results in a transformer circuit, a voltage being induced into the second and third coils 3, 4 respectively, as a result of the magnetic flux generated through the first coil 2 in the core 1.

Using a permanently magnetic ring magnet 5 which is polarized in the axial direction and through which the first coil 2 passes, the soft magnetic core 1 is locally saturated, which is equivalent to the virtual division of the strip into two sections. The ring magnet 5 can be moved along the first coil 2. This linear movement is indicated in the figure using the double arrow 6. A different voltage is induced in both coils 3 and 4 as a function of the position of the ring magnet 5 and thus the position of the magnetic saturation. This essential functionality is known for PLCD linear sensors from the publication "PLCD displacement sensor for industrial applications", Tyco Electronics AMP GmbH 2001, for example. With the PLCD sensor described here, a permanent magnet is moved in a linear manner at one side of the first coil.

To be able to determine the linear position of printing roller for example, independently of its rotational movement, according to the invention the magnet 5 is supported around the first coil in a rotatable manner. In the present case the ring magnet can execute a rotational movement, which is indicated using the double arrow 7. The ring magnet 5 can thus rotate about its center axis without this influencing the position value measured by the PLCD sensor. This means that there is no need for a ball bearing or the like for example for decoupling the rotational movement, as is the case for example with position sensors which are implemented with the aid of glass measuring rods or potentiometers. Furthermore contactless measuring ensures wear-free operation.

The invention claimed is:

1. A position sensor for detecting the axial position of a rotating element, the sensor comprising:
    a longitudinally extending, soft magnetic core;
    a first coil wound round the soft magnetic core essentially along the entire longitudinal extension of the core;
    a second coil wound round a first end of the core and having a shorter longitudinal extension than the first coil;
    a magnet polarized and moveable in a longitudinal direction of the core, wherein the magnet is shaped as a ring, and the core is arranged in an opening of the ring; and
    a rotational device adapted to rotate the magnet about a longitudinal axis of the core.

2. The position sensor according to claim 1 further comprising a third coil wound round a second end of the core and having a shorter longitudinal extension than the first coil.

3. The position sensor according to claim 1 wherein the magnet is a permanent magnet and the rotating element includes the rotational device.

4. The position sensor according to claim 1 wherein the soft magnetic core is shaped as a strip or shaped as a round rod.

5. The position sensor according to claim 3, wherein the soft magnetic core is shaped as a strip or shaped as a round rod.

6. A print roller for rotational movement in combination with lineal movement along an axis, the print roller configured to sense its axial position, the print roller comprising:
    a longitudinally extending, soft magnetic core;
    a first coil wound round the soft magnetic core essentially along the entire longitudinal extension of the core;
    a second coil wound round a first end of the core and having a shorter longitudinal extension than the first coil;
    a magnet polarized and moveable in a longitudinal direction of the core, wherein the magnet is shaped as a ring, and the core is arranged in an opening of the ring; and
    a rotational device adapted to rotate the magnet about a longitudinal axis of the core.

7. The print roller according to claim 6, wherein the magnet is a permanent magnet and the rotational device is part of the print roller.

8. The print roller according to claim 6, wherein the soft magnetic core is shaped as a strip or shaped as a round rod.

9. The print roller according to claim 6, further comprising a third coil wound round a second end of the core and having a shorter longitudinal extension than the first coil.

* * * * *